United States Patent
Moxon et al.

(10) Patent No.: US 10,380,205 B2
(45) Date of Patent: Aug. 13, 2019

(54) ALGORITHM FOR SELECTING AND SCORING SUGGESTED ACTION

(71) Applicant: Microsoft Technology Licensing, LLC, Redmond, WA (US)

(72) Inventors: Drew Scott Baird Moxon, Mountain View, CA (US); Nipun Dave, Mountain View, CA (US); Nikita Igorevych Lytkin, Sunnyvale, CA (US); Sachit Kamat, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 14/843,731

(22) Filed: Sep. 2, 2015

(65) Prior Publication Data
US 2016/0292284 A1 Oct. 6, 2016

Related U.S. Application Data
(60) Provisional application No. 62/141,169, filed on Mar. 31, 2015.

(51) Int. Cl.
G06F 17/30 (2006.01)
G06F 16/9535 (2019.01)
G06F 16/2457 (2019.01)

(52) U.S. Cl.
CPC .... *G06F 16/9535* (2019.01); *G06F 16/24578* (2019.01)

(58) Field of Classification Search
USPC ........ 707/607, 609, 687, 705, 790, 813, 821
See application file for complete search history.

(56) References Cited

U.S. PATENT DOCUMENTS
| | | |
|---|---|---|
| 8,180,804 B1 | 5/2012 | Narayanan et al. |
| 8,413,060 B1 | 4/2013 | Agrawal |
| 8,977,611 B2 | 3/2015 | Tseng |
| | (Continued) | |

FOREIGN PATENT DOCUMENTS
| | | |
|---|---|---|
| WO | WO-2008043143 A1 | 4/2008 |

OTHER PUBLICATIONS
"U.S. Appl. No. 14/674,755, Examiner Interview Summary dated Aug. 18, 2015", 3 pgs.
(Continued)

*Primary Examiner* — Sana A Al-Hashemi
(74) *Attorney, Agent, or Firm* — Schwegman Lundberg & Woessner, P.A.

(57) ABSTRACT

Techniques for presenting a personalized member profile page to a viewer are described. The online social network service system can access a sender score of a sender requesting to view a profile page in an online social network service, and access a receiver score of a receiver associated with the profile page. Additionally, a suggested action can be determined based on the sender score and the receiver score, a sender confirmation to perform the suggested action can be received, and a communication associated with the suggested action can be transmitted in response to the received sender confirmation. Subsequently, the online social network service system can classify an interaction between the sender and the receiver, and update the receiver score and the sender score based on the classified interaction.

20 Claims, 13 Drawing Sheets

(56) References Cited

U.S. PATENT DOCUMENTS

| | | |
|---|---|---|
| 9,817,905 B2 | 11/2017 | Dave et al. |
| 9,875,286 B1* | 1/2018 | Lewis ............... G06F 16/24578 |
| 2004/0153444 A1 | 8/2004 | Senders et al. |
| 2012/0166532 A1 | 6/2012 | Juan et al. |
| 2013/0031090 A1 | 1/2013 | Posse et al. |
| 2013/0054698 A1* | 2/2013 | Lee ................... G06Q 30/0259 709/204 |
| 2013/0066992 A1* | 3/2013 | Ben-Yoseph ......... H04L 51/043 709/206 |
| 2013/0073336 A1* | 3/2013 | Heath .................. G06Q 30/02 705/7.29 |
| 2013/0080427 A1 | 3/2013 | Cross et al. |
| 2013/0086078 A1 | 4/2013 | Malleshaiah |
| 2013/0124538 A1 | 5/2013 | Lee et al. |
| 2013/0159298 A1* | 6/2013 | Mason ............... G06F 16/9535 707/728 |
| 2013/0232200 A1 | 9/2013 | Knapp |
| 2014/0089780 A1 | 3/2014 | Garcia-martinez et al. |
| 2014/0244531 A1 | 8/2014 | Baldwin et al. |
| 2014/0244561 A1 | 8/2014 | Cheng et al. |
| 2014/0324846 A1 | 10/2014 | Rekhi |
| 2014/0337436 A1 | 11/2014 | Hoagland et al. |
| 2015/0127565 A1 | 5/2015 | Chevalier et al. |
| 2016/0292280 A1 | 10/2016 | Dave et al. |

OTHER PUBLICATIONS

"U.S. Appl. No. 14/674,755, Final Office Action dated Oct. 30, 2015", 29 pgs.

"U.S. Appl. No. 14/674,755, Non Final Office Action dated Jun. 5, 2015", 49 pgs.

"U.S. Appl. No. 14/674,755, Respons filed Aug. 26, 2015 to Non Final Office Action dated Jun. 5, 2015", 18 pgs.

"U.S. Appl. No. 14/674,755, Examiner Interview Summary dated Mar. 3, 2016", 3 pgs.

"U.S. Appl. No. 14/674,755, Examiner Interview Summary dated Aug. 9, 2016", 3 pgs.

"U.S. Appl. No. 14/674,755, Non Final Office Action dated Mar. 31, 2016", 33 pgs.

"U.S. Appl. No. 14/674,755, Response filed Feb. 29, 2016 to Final Office Action dated Oct. 30, 2015", 10 pgs.

"U.S. Appl. No. 14/674,755, Response filed Aug. 1, 2016 to Non Final Office Action dated Mar. 31, 2016", 13 pgs.

"U.S. Appl. No. 14/674,755, Final Office Action dated Oct. 27, 2016", 35 pgs.

"U.S. Appl. No. 14/674,755, Notice of Allowance dated Jul. 13, 2017", 8 pgs.

"U.S. Appl. No. 14/674,755, Response filed Feb. 27, 2017 to Final Office Action dated Oct. 27, 2016", 12 pgs.

U.S. Appl. No. 14/674,755, filed Mar. 31, 2015, Profile Personalization Based on Viewer of Profile.

* cited by examiner

FIG. 8

ALGORITHM FOR SELECTING AND SCORING SUGGESTED ACTION

PRIORITY CLAIM

This application claims priority to U.S. Provisional Patent Application Ser. No. 62/141,169, filed Mar. 31, 2015, which is incorporated herein by reference in its entirety.

CROSS-REFERENCE TO RELATED APPLICATIONS

This application is related to U.S. Non-provisional patent application Ser. No. 14/674,755, filed Mar. 31, 2015.

TECHNICAL FIELD

This application relates generally to social networking and, more particularly, to a social networking system which allows profile personalization of a member profile based member data and viewer data (e.g., information accessed from a profile of a viewer). The present disclosure additionally relates to suggesting an action based on the member data and the viewer data, and scoring the member and viewer based on their interaction with to the suggested action.

BACKGROUND

Social networks provide a platform for a user to interact, make connections, and collaborate with an online community of people with similar interests, needs, and goals. A social network can include a member profile (e.g., profile page) for each member of the social network. The member profile of a member can be modified by the member. Additionally, the social network system can allow viewers to view a member profile. For example, a member profile may include contact information, educational information, employment information, connections to other members, skills, and interests.

BRIEF DESCRIPTION OF THE DRAWINGS

Some embodiments are illustrated by way of example and not limitation in the figures of the accompanying drawings.

FIG. 8 is an example of a personalized member profile page in a social network system, according to various embodiments.

DETAILED DESCRIPTION

Figure 1:
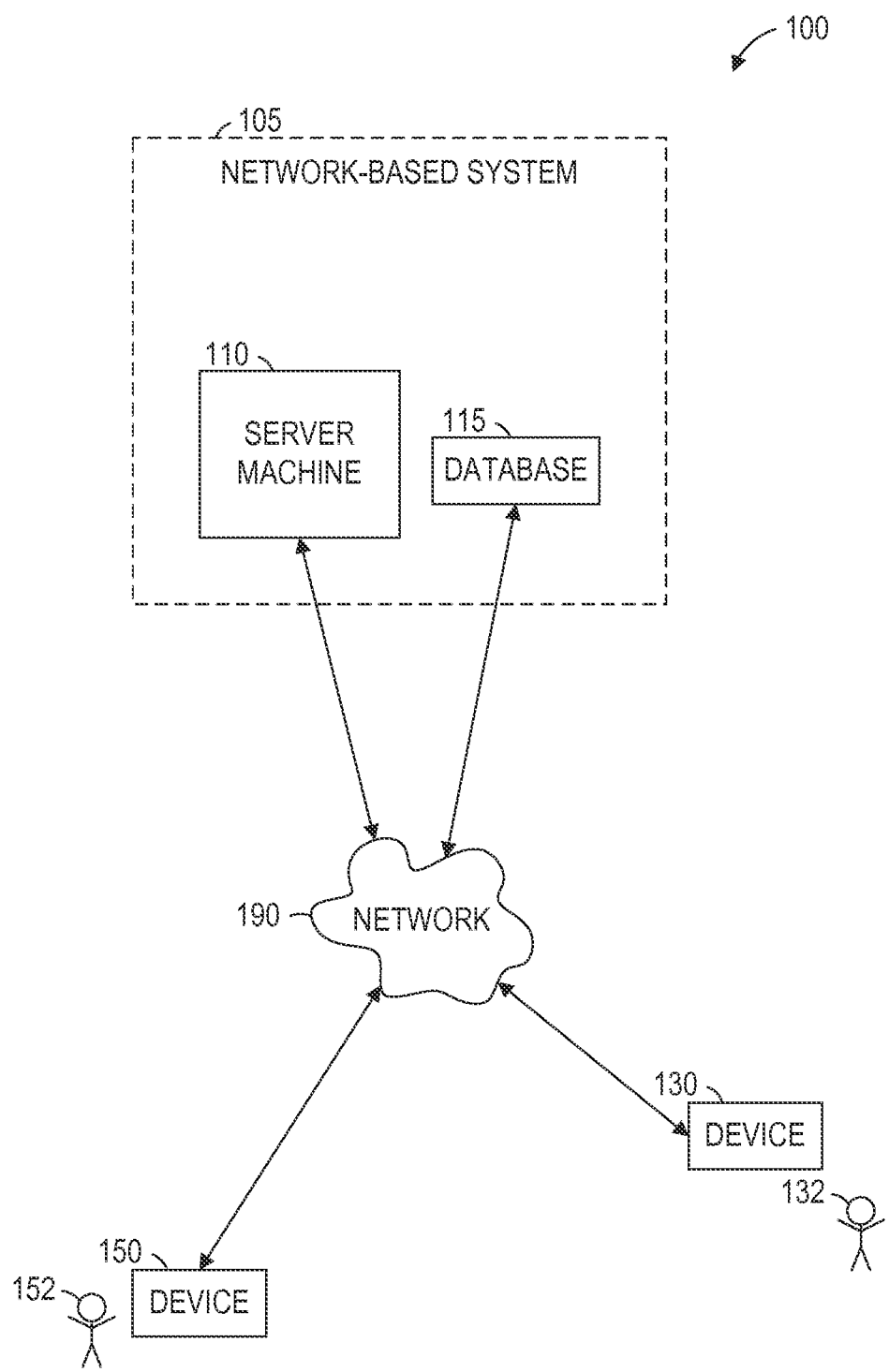
FIG. 1 is a network diagram illustrating a network environment suitable for a social network, according to various embodiments.

Example methods and systems are directed to techniques for personalizing a member profile (e.g., profile page) of a member based on information accessed from a viewer of the member profile. More specifically, the present disclosure relates to methods, systems, and computer program products for determining a suggested action based on a viewer score and a member (e.g., receiver) score. Furthermore, the viewer score and the member score are updated based on the member and viewer's interaction with the suggested action.

A social network can allow viewers to view profile pages of a member in the social network. The member profile of a member can be a personalized profile that presents member attributes (e.g., profile highlights) on the profile page. The social network system can use an algorithm to determine (e.g., identify) member attributes of the member that are relevant (e.g., calculated based on common attributes) to the viewer of the profile page. In some instances, the member attributes can be ranked based on an overall score.

For example, a profile page can include profile data such as contact information, educational information, career information, connections, skills, and interests. In order to capture the viewer's attention, the member attributes with high scores that are presented on the profile page can be highlighted or emphasized. A member attribute can be specifically highlighted for the viewer, based on the viewer's member data. Additionally, a recommendation for the viewer can be determined based on the viewer's member data.

A highlight module can determine the member attributes to include in a member profile page for a specific viewer. A profile page generation module can generate and present the profile page of the member to the viewer. Additionally, once the member attribute (e.g., highlight) is selected by the viewer, the social network can determine and recommend (e.g., present) an action to the viewer based on the selection. For example, the suggested action can include a recommendation to email or message the member. Furthermore, the viewer can confirm (e.g., approve) to perform the recommended action. An action module can perform the action in response to the viewer's confirmation.

According to some embodiments, the social network can have a scoring system to determine the interaction between the viewer and the member. The scoring system can encourages all members of a social network to become good actors, and identifying bad actors in the social network can improve the ecosystem of the social network. The scoring system can encourage members to use the system in a way that promotes positive communication and networking, particularly to inactive members. The scoring system promotes sending a good action by improving a member's score as a reward for the good action.

In some instances, the scoring system can reduce the social media noise in the social network by penalizing a member (e.g., by reducing the member's score) for sending a large number of potentially irrelevant actions (e.g., spam). Furthermore, the scoring system can minimize the impact of spammers and those who use the social network for unsuitable interactions, but removing some functionality from the social network from a spammer once the spammer's score is below a predetermined threshold. Moreover, the scoring system can help measure the social network performance across different time periods.

Techniques described herein can determine the relevant (e.g., featured) member attributes for a viewer, and present the relevant member attributes as profile highlights in a profile page of a member. The scoring system can reduce noise in a social network, and increase connectivity between members in the social network. Noise can be reduced by identifying spammers and removing access to features in the social network from the identified spammers. Connectivity can be increased by suggesting that members connect to other members or contact other members.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store member data (e.g., profile data, social graph data) for the social network service. The server machine 110, the first device 130, and the second device 150 may each be implemented in a computer system, in whole or in part, as described below with respect to FIG. 12.

Also shown in FIG. 1 are the users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases 115, or devices 130, 150 shown in FIG. 1 may be implemented in a general-purpose computer modified (e.g., configured or programmed) by software (e.g., one or more software modules) to be a special-purpose computer to perform one or more of the functions described herein for that machine, database 115, or device 130, 150. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases 115, or devices 130, 150 illustrated in FIG. 1 may be combined into a single machine, database 115, or device 130, 150, and the functions described herein for any single machine, database 115, or device 130, 150 may be subdivided among multiple machines, databases 115, or devices 130, 150.

The network 190 may be any network that enables communication between or among machines, databases 115, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
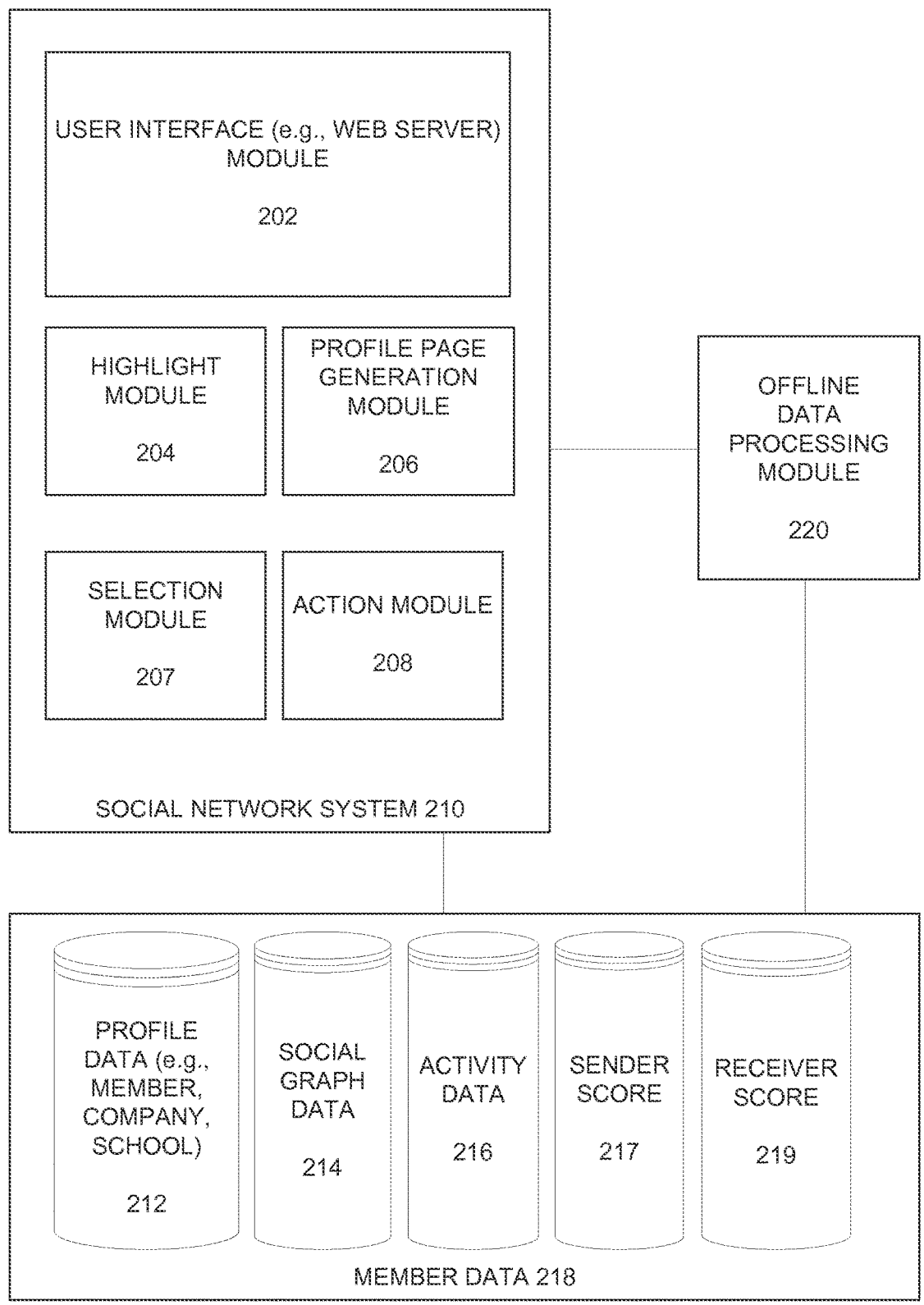
FIG. 2 is a block diagram illustrating various modules of a social network service, according to various embodiments.

FIG. 2 is a block diagram illustrating components of a social network system 210, according to some example embodiments. The social network system 210 is an example of a network-based system 105 of FIG. 1. The social network system 210 can include a user interface module 202, an highlight module 204, a profile page generation module 206, a selection module 207, and an action module 208, all configured to communicate with each other (e.g., via a bus, shared memory, or a switch).

Additionally, the social network system 210 can communicate with the database 115 of FIG. 1, such as a database 115 storing member data 218. The member data 218 can include profile data 212, social graph data 214, and activity data 216. For example, using profile data 212, the highlight module 204 can determine a profile attribute. Additionally, the highlight module 204 can determine a network attribute using social graph data 214. Furthermore, the highlight module 204 can determine an event attribute using activity data 216.

In some instances, the highlight module 204 can be configured to process data offline or periodically using an offline data processing module 220. For example, the offline data processing module 220 can include Hadoop servers that access the member data 218 periodically (e.g., on a nightly basis). Processing the member data 218, such as generating an overall score for each member attribute (e.g., profile attribute, network attribute, and event attribute), and generating a list of member attributes may be computationally intensive. Therefore, due to hardware limitations and to ensure reliable performance of the social network, some of the calculation and forecasting can be done offline. For example, some of the parameters (e.g., overall score, an entity score, a network score, an event score, an entity coefficient, a network coefficient, and an event coefficient) can be calculated offline. Additionally, the generated ranked list for each parameter can be calculated offline. Therefore, these parameters can be inputted in the highlight module 204 (e.g., consolidation module) in real-time in order to almost instantaneously present the featured member attributes to the viewer.

As will be further described with respect to FIGS. 3-7, the highlight module 204, in conjunction with the user interface module 202 and profile page generation module 206, can present a personalized member profile page that is relevant and specific to a viewer.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database 115, or device 130, 150 may be distributed across multiple machines, databases 115, or devices 130, 150.

As shown in FIG. 2, the member data 218 can be stored in several databases 115. The member data 218 includes a first database 115 for storing the profile data 212, including both member profile data, viewer profile data and profile data 212 for various organizations. Additionally, the member data 218 can store the social graph data 214 in a second database 115 and the activity data 216 in a third database 115.

In some embodiments, the member data 218 may be processed (e.g., real-time, background/offline) using the highlight module 204 to calculate an overall score for each member attribute associated with a member. As previously mentioned, a member attribute can either be an entity attribute, a network attribute, or an event attribute.

Figure 4:
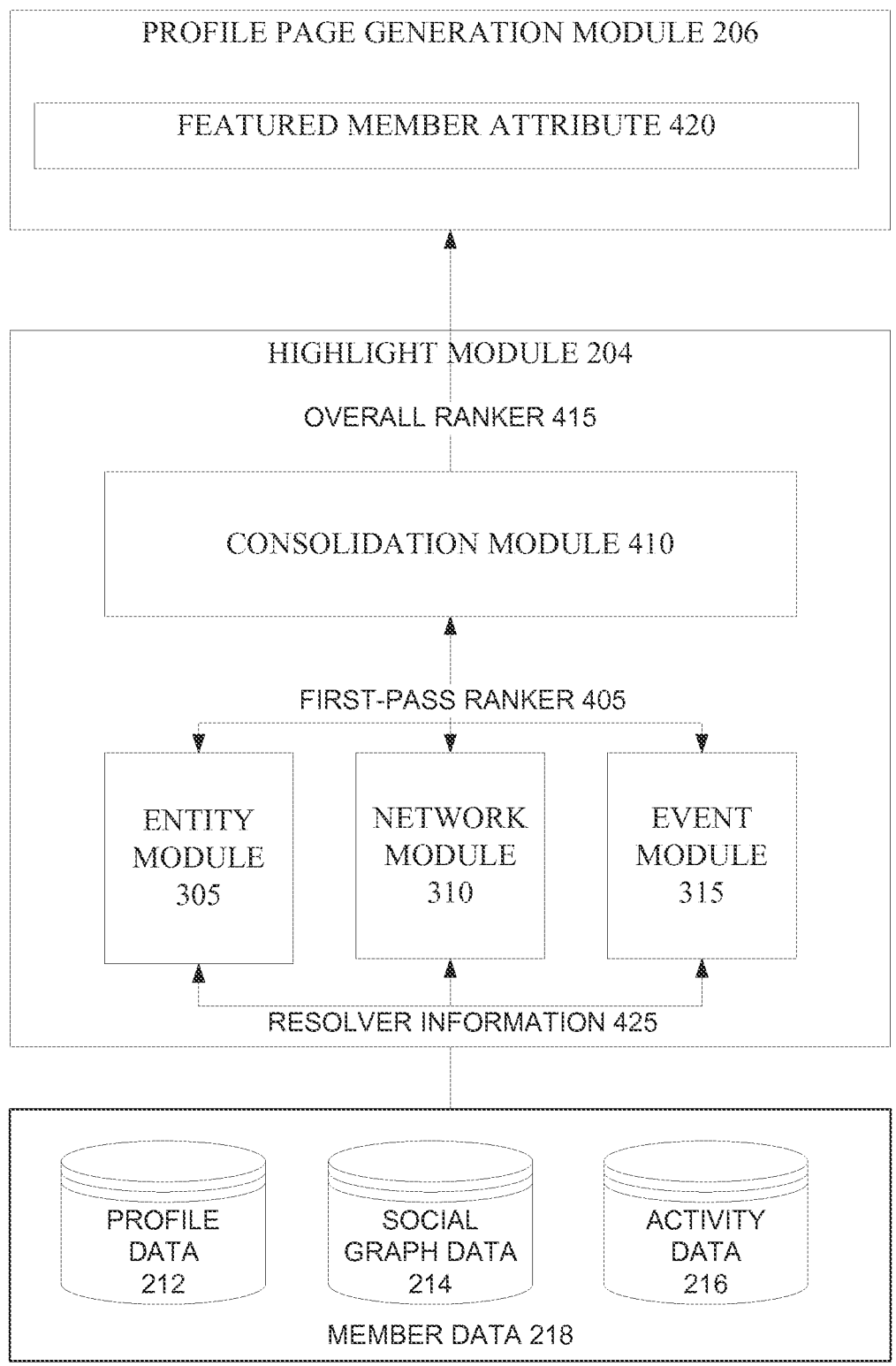
FIG. 4 is a block diagram illustrating various modules of a highlight module and profile page generation module for presenting a featured member attribute, according to various embodiments.

An entity attribute can be derived from the profile data 212. Additionally, using the profile data 212 and viewer data, an entity score can be calculated. The highlight module 204 and the entity module 305 can use the entity score to determine whether an entity attribute is a featured member attribute. An entity attribute can be a featured member attribute when the entity score multiplied by an entity coefficient is higher than overall scores associated with other member attributes. FIG. 4 further describes techniques for determining a featured member attribute.

For instance, with many social network services, when a user 132, 152 registers to become a member, the member is prompted to provide a variety of personal and employment information to be displayed in the member's personal web page. Such information is commonly referred to as entity attributes. The entity attributes that are commonly requested and displayed as part of a member's profile include the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on.

In some embodiments, the entity attributes may include the various skills that each member has indicated he or she possesses. Additionally, the entity attributes may include skills for which a member has been endorsed.

With certain social network services, such as some business or professional network services, the entity attributes may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Another example of the profile data 212 can include data associated with a company page. For example, when a representative of an entity initially registers the entity with the social network service, the representative may be prompted to provide certain information about the entity. This information may be stored, for example, in the database 115 and displayed on a company profile page. This type of profile data 212 can also be used in generating the personalized profile page described herein.

Additionally, social network services provide their users 132, 152 with a mechanism for defining their relationships with other people. This digital representation of real-world relationships is frequently referred to as a social graph.

In some instances, the social graph data 214 can be based on a member's presence within the social network service. For example, consistent with some embodiments, a social graph is implemented with a specialized graph data structure in which various members are represented as nodes connected by edges. The social graph data 214 can be used by the highlight module 204 and the network module 310 of FIG. 3 to determine to network attributes. Additionally, using the social graph data 214 and viewer data, the highlight module 204 can calculate a network score and a network coefficient. The network score multiplied by the network coefficient can determine the overall score. In cases when the overall score for a network attribute is higher than the overall score of other member attributes, the network attribute can be a featured member attribute. As previously mentioned, the profile page generation module 206 can include the featured member attribute when generating a personalized profile page that is specific to a viewer.

In addition to hosting a vast amount of social graph data 214, many social network services maintain activity data 216. An event attribute can be based on information accessed from the activity data 216. The activity data 216 can include an access log, profile page views, entity page views, newsfeed postings, birthday information, and clicking on links on the social network system 210. Additionally, the activity data 216 can include information associated with applications and services that allow members the opportunity to share and receive information, often customized to the interests of the member. In some embodiments, members may be able to self-organize into groups, or interest groups, organized around subject matter or a topic of interest.

The activity data 216 can be used by the highlight module 204 and the event module 315 (FIG. 3) to determine to event attributes. Additionally, using the activity data 216 and viewer data, the highlight module 204 can calculate an event score and an event coefficient. The event score multiplied by the event coefficient can determine the overall score. In cases when the overall score for an event attribute is higher than the overall score of other member attributes, the event attribute can be a featured member attribute. As previously mentioned, the profile page generation module 206 can include the featured member attribute when generating a personalized profile page that is specific to a viewer.

Figure 9:
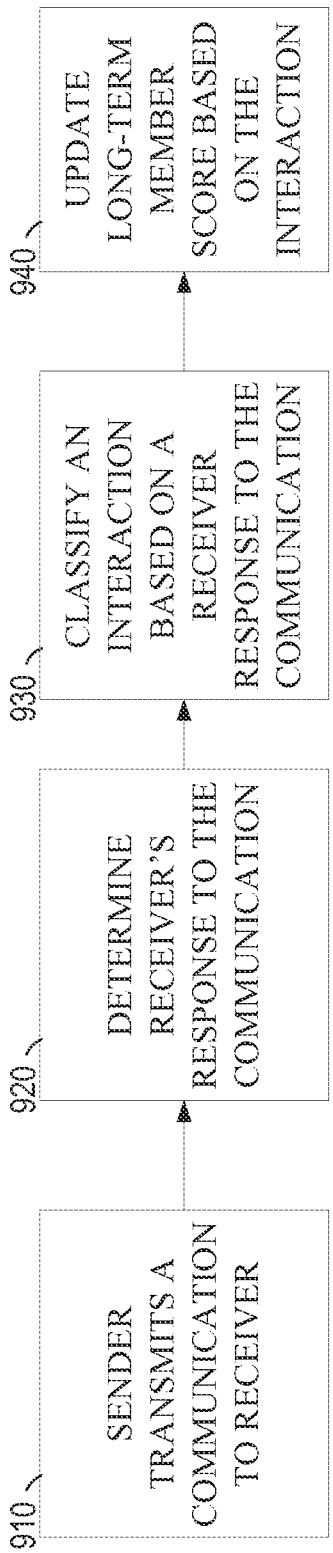
FIG. 9 is a flowchart illustrating a method for classifying an interaction between a sender and a receiver, according to various embodiments.
Figure 10:
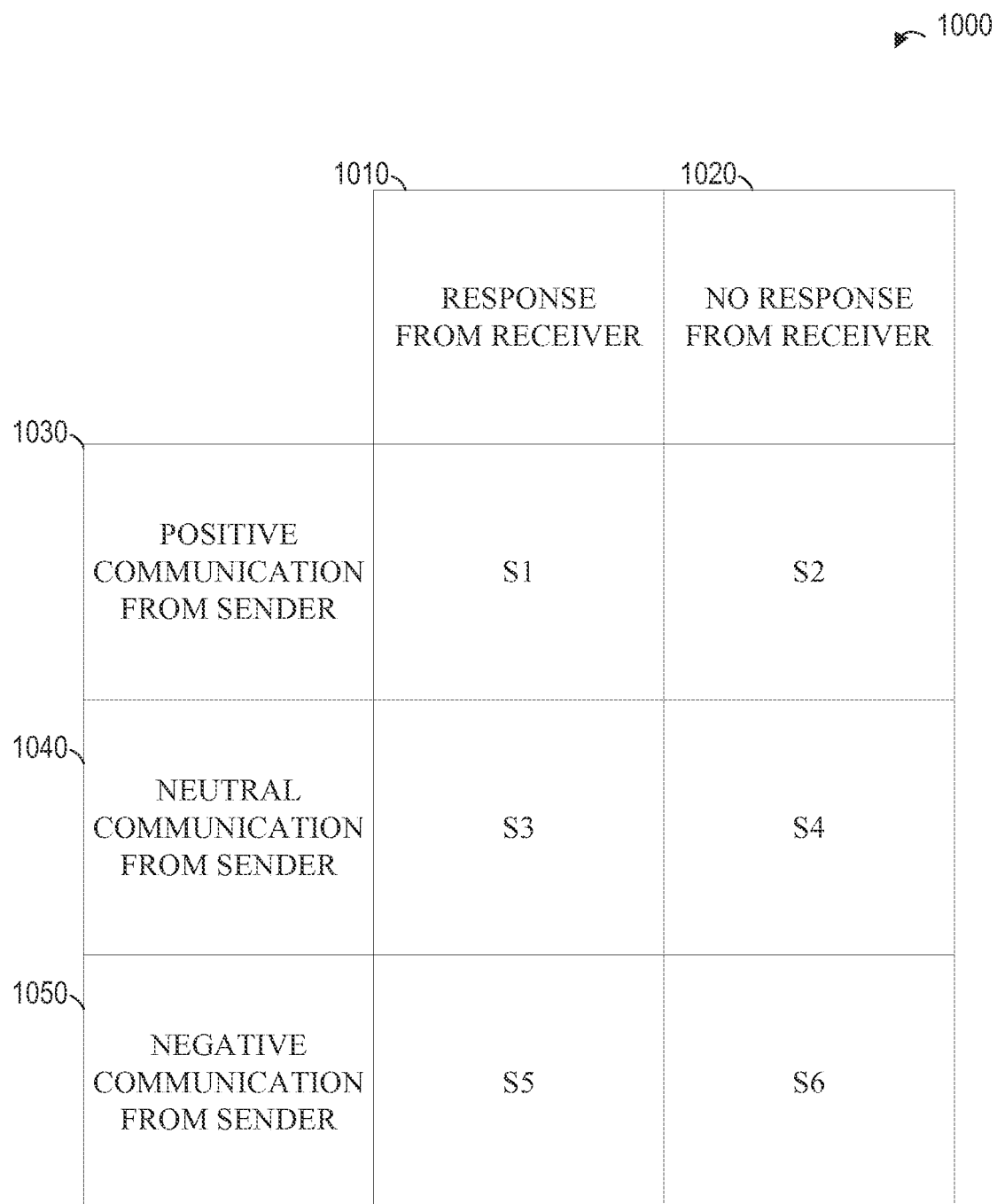
FIG. 10 is a classification table illustrating a scoring system, according the various embodiments.
Figure 11:
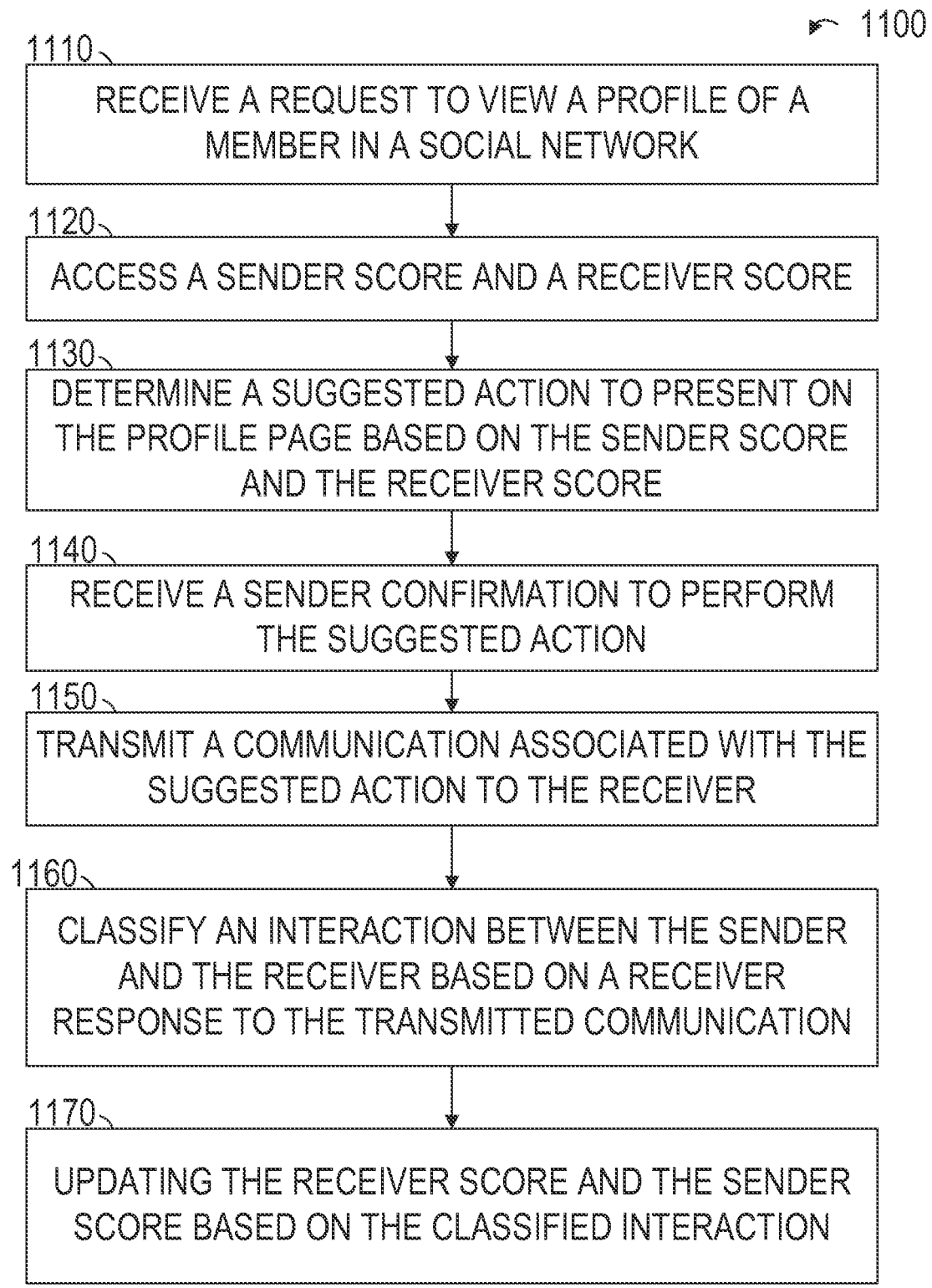
FIG. 11 is a flowchart illustrating a method for updating a sender score and a receiver score based on a classification of the interaction between the sender and the receiver, according to various embodiments.

Furthermore, the member data 218 can include a sender score 217 and a receiver score 219 for each member profile. In some instances, a member can have both a sender score 217 and a receiver score 219. The sender score 217 can be a score associated with a member transmitting a communication to a receiver. For example, the sender score 217 can: increase when the communication from the sender is classified as positive; decrease when the communication from the sender is classified as negative; or stay the same when the communication from the sender is classified as neutral. The receiver score 219 can be a score associated with the receiver's response to the transmitted communication. For example, the receiver score 219 can be updated based on the classification of the communication and whether the receiver responds to the communication. FIGS. 9-11 further describe the determination of the sender score 217 and the receiver score 219.

In some instances, the sender score 217 can be stored in a first database 115, and the receiver score 219 can be stored in a second database 115. In other instances, the sender score 217 and the receiver score 219 can be stored in the same database 115.

Figure 3:
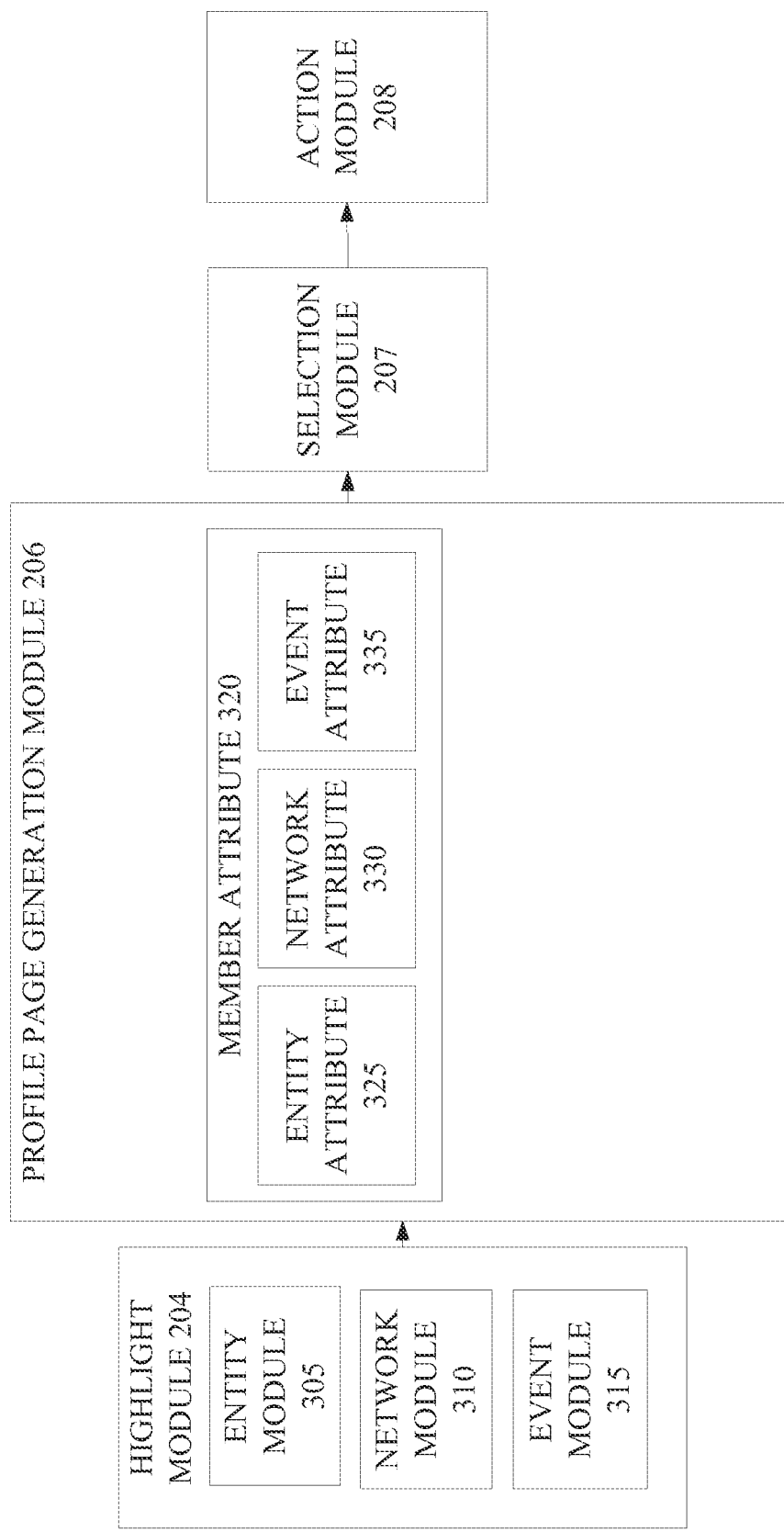
FIG. 3 is a block diagram illustrating various modules of a social network system for determining a member attribute, recommending an action, and performing an action based on a user input, according to various embodiments.

FIG. 3 is a block diagram illustrating components of a social network system 210 for determining a member attribute, recommending an action, and performing an action based on a user input, according to some example embodiments.

The highlight module 204 can include an entity module 305, a network module 310, and an event module 315. The entity module 305 can access profile data 212 of the member, and access viewer data (e.g., profile data 212 of the viewer). Additionally, an entity attribute 325 can be derived from the profile data 212 of the member. Furthermore, an entity score associated with the entity attribute 325 can be calculated based on the profile data 212 of the member and the viewer data.

The network module 310 can access social graph data 214 of the member and viewer data (e.g., social graph data 214 of the viewer). Additionally, a network attribute 330 can be derived from the social graph data 214 of the member. Furthermore, a network score associated with the network attribute 330 can be calculated based on the social graph data 214 of the member and the viewer data.

The event module 315 can access activity data 216 of the member, and access viewer data (e.g., profile data 212 and social graph data 214 of the viewer). Additionally, an event attribute 335 can be derived from the activity data 216 of the member. Furthermore, an event score associated with the event attribute 335 can be calculated based on the activity data 216 of the member and the viewer data.

The profile page generation module 206 can generate a personalized profile page based on a member attribute 320. The member attribute 320 can either be the entity attribute 325, the network attribute 330, or the event attribute 335. The profile page generation module 206 can include featured member attributes in a personalized profile page. A member attribute 320 can be a featured member attribute when the overall score of the member attribute 320 is higher than the overall score of other member attributes 320. As previously described, the overall score is calculated by multiplying: the entity attribute 325 by the entity coefficient; the network attribute 330 by the network coefficient; or the event attribute 335 by the event coefficient.

In some instances, the personalized profile page can include a plurality of featured member attributes. Additionally, the personalized profile page may only include featured member attributes when at least a predetermined number of member attributes 320 have a high enough overall score to be a featured member attribute.

For example, a personalized profile page can include a predetermined number of featured member attributes (e.g., highlights) based on the specific viewer. Additionally, the profile page generation module 206 can emphasize or highlight the featured member attribute to capture the viewer's attention.

Furthermore, in some instance, the viewer may select (e.g., click) the featured member attribute on the personalized profile page. In response to the selection, the selection module 207 can determine and recommend (e.g., present) a recommended action to the viewer. For example, the selection module 207 can present a popup window to the viewer with the recommended action, such as a recommendation to message the member. Continuing with the example, the viewer can send a confirmation to perform the recommended action with a user input. In response to the confirmation, an action module 208 can perform the action, such as draft a message to the member on behalf of the viewer, or send a connection request to the member.

Example member features based on member data 218 and viewer data are described. For example, the viewer can be a recruiter, sales solutions subscriber, active job seeker, marketer, and so on. When the viewer is a recruiter, the member attributes 320 can include features describing positions the recruiter is hiring for, such as preferred skills, experience, and education. When the viewer is a sales professional, the member attributes 320 include features describing types of companies and seniority of leads the viewer is interested in selling to, or contacting.

Additionally, a member attribute 320 can be based on a comparison of skills on the profiles of the member and the viewer. A member attribute 320 can also include information related to the shortest distance between the viewer and member in the connections graph.

Furthermore, a member attribute 320 can be based on the member and the viewer's industries, skills and levels of expertise in those skills, work experience (e.g., companies, titles), and education (e.g., schools, fields of study, degrees) as analyzed by the highlight module 204. The highlight module 204 can compare the degree of similarity between these dimensions to calculate a score (e.g., overall score) for these member attributes 320.

Moreover, member attributes 320 can be based on the representations of the member and the viewer's network of connection. The network of connection can include industries, companies, roles/titles, network-level skills profiles (e.g., 50% of people in viewer's network are skilled in Sales, 70% of people in member's network are skilled in Sales, etc.). The overall score for each of these member attributes 320 can be calculated based on the degree of similarity between the two members' networks based on the number of connections in common, and similarities between the aforementioned dimensions.

A member attribute 320 can also include content post, company overlap, connections in common, education in common, network insight, job opening at member's current or past company, skill expertise, and so on. The overall score can be based on details associated with the member attribute 320. Details associated with the member attribute 320 may include background contents of the member attribute 320, company; title; school; content features (if the highlight is a post) such as topics and keywords; skills associated with the member attribute 320 (e.g., skills relevant to a content post, skills on viewer's profile, and so on). Additionally, the overall score can be based on the timeframe associated with the member attribute 320 (e.g., recent content post versus education obtained 15 years ago).

FIG. 4 is a block diagram illustrating various modules of the highlight module 204 and profile page generation module 206 for calculating an overall score in order to determine a featured member attribute, according to various embodiments.

The highlight module 204 can include the entity module 305, the network module 310, the event module 315, and a consolidation module 410. The entity module 305, the network module 310, and the event module 315 can generate a first-pass ranker (FPR) 405 of candidate featured member attributes (e.g., candidate highlights) to possibly include in the personalized profile page. The consolidation module 410 receives the FPR 405, and generates an overall ranker 415 which determines the featured member attributes to be included in the personalized profile page.

The entity module 305 sends to the consolidation module 410 an FPR 405 associated with entity attributes 325. As previously mentioned, an entity attribute 325 can be derived from the member data 218, and specifically from the profile data 212. The FPR 405 from the entity module 305 includes a ranked list of entity attributes 325 and their corresponding entity score. In some instances, the FPR 405 also includes a uniform resource locator (URL) corresponding to each entity attribute 325. For example, the URL can be used by device 130 or profile page generation module 206 to retrieve the information associated with the entity attribute 325 in order to present the information on a profile page. An example of an FPR 405 is a <list of URLs, score>. The URL corresponds to a unique identifier for a member attribute 320 (e.g., entity attribute 325).

Additionally, the entity module 305 can receive resolver information 425 from the social network system 210. The resolver information 425 can be used to calculate the entity score for an entity attribute 325. For example, resolver information 425 can include past performance data associated with the entity attribute 325. Additionally, the resolver information 425 can include a reference to the entity attribute 325 based on the corresponding URL.

The network module 310 sends an FPR 405 associated with network attributes 330 to the consolidation module 410. As previously mentioned, a network attribute 330 can be derived from the social graph data 214. The FPR 405 from the network module 310 includes a ranked list of network attributes 330 and their corresponding network score. In some instances, the FPR 405 also includes a URL corresponding to each network attribute 330. For example, the URL can be used to retrieve the information associated with the network attribute 330. Additionally, the network module 310 can receive resolver information 425 from the consolidation module 410. The resolver information 425 can be used to calculate the network score for a network attribute 330. For example, resolver information 425 can include past performance data associated with the network attribute 330. Additionally, the resolver information 425 can include a reference to the network attribute 330 based on the corresponding URL.

The event module 315 sends an FPR 405 associated with event attributes 335 to the consolidation module 410. As previously mentioned, the event attribute 335 can be derived from the activity data 216. The FPR 405 from the event module 315 includes a ranked list of event attributes 335 and their corresponding event score. In some instances, the FPR 405 also includes a URL corresponding to each event attribute 335. For example, the URL can be used to retrieve the information associated with the event attribute 335. Additionally, the event module 315 can receive resolver information 425 from the consolidation module 410. The resolver information 425 can be used to calculate the event score for an event attribute 335. For example, resolver information 425 can include past performance data associated with the event attribute 335. Additionally, the resolver information 425 can include a reference to the event attribute 335 based on the corresponding URL.

For example, the entity module 305, the network module 310, and the event module 315 can each transmit an FPR 405 which has a plurality (e.g., ten) of member attributes 320 for each module. In some instances, the processing to generate the FPR 405 can be performed online by the social network system 210 or offline by the offline data processing module 220.

Then, the consolidation module 410 can generate an overall ranker 415 based on the received FPR 405 from the entity module 305, the received FPR 405 from the network module 310, and the received FPR 405 from the event module 315. The overall ranker 415 can sometimes be referred to a as second pass ranker. The overall ranker 415 includes a member attribute 320 with a corresponding overall score. The profile page generation module 206 can use the overall ranker 415 to determine a featured member attribute 420 (e.g., highlight). For example, the featured member attribute 420 is included in the profile page of a member when a viewer visits the profile page. In some instances, the featured member attributes 420 are the member attributes 320 with the highest overall scores. For example, the profile page can include three featured member attributes 420 that correspond to the member attributes 320 with the three highest overall scores.

In some instances, the consolidation module 410 (e.g., a feed-mixer) can generate a home page feed and a profile page using the overall ranker 415. The overall ranker 415 consolidates all of the member attributes 320 (e.g., highlights) from the modules (e.g., the entity module 305, the network module 310, and the event module 315). Additionally, using an online relevance model, the consolidation module 410 applies a coefficient (e.g., multiplier) to each of the scores (e.g., entity score, network score, event score). Subsequently, the consolidation module 410 re-ranks the member attributes 320 based on the coefficient. The coefficient is based on past performance data. Examples of past performance data includes the probability that a viewer will interact with a specific member attribute 320 based on past viewer interactions with the specific member attribute 320. Another example of past performance data includes the type of actions previously performed by a viewer based on a featured member attribute 420 presented on a profile page.

The overall ranker 415 can include a new list of URLs and corresponding overall scores. The new list of URLs can be ranked (e.g., ordered) based on the overall score for each URL. Additionally, the consolidation module 410 can generate resolver information 425. The resolver information 425 can resolve (e.g., reference) each of the URLs to a corresponding member attribute 320.

Figure 5:
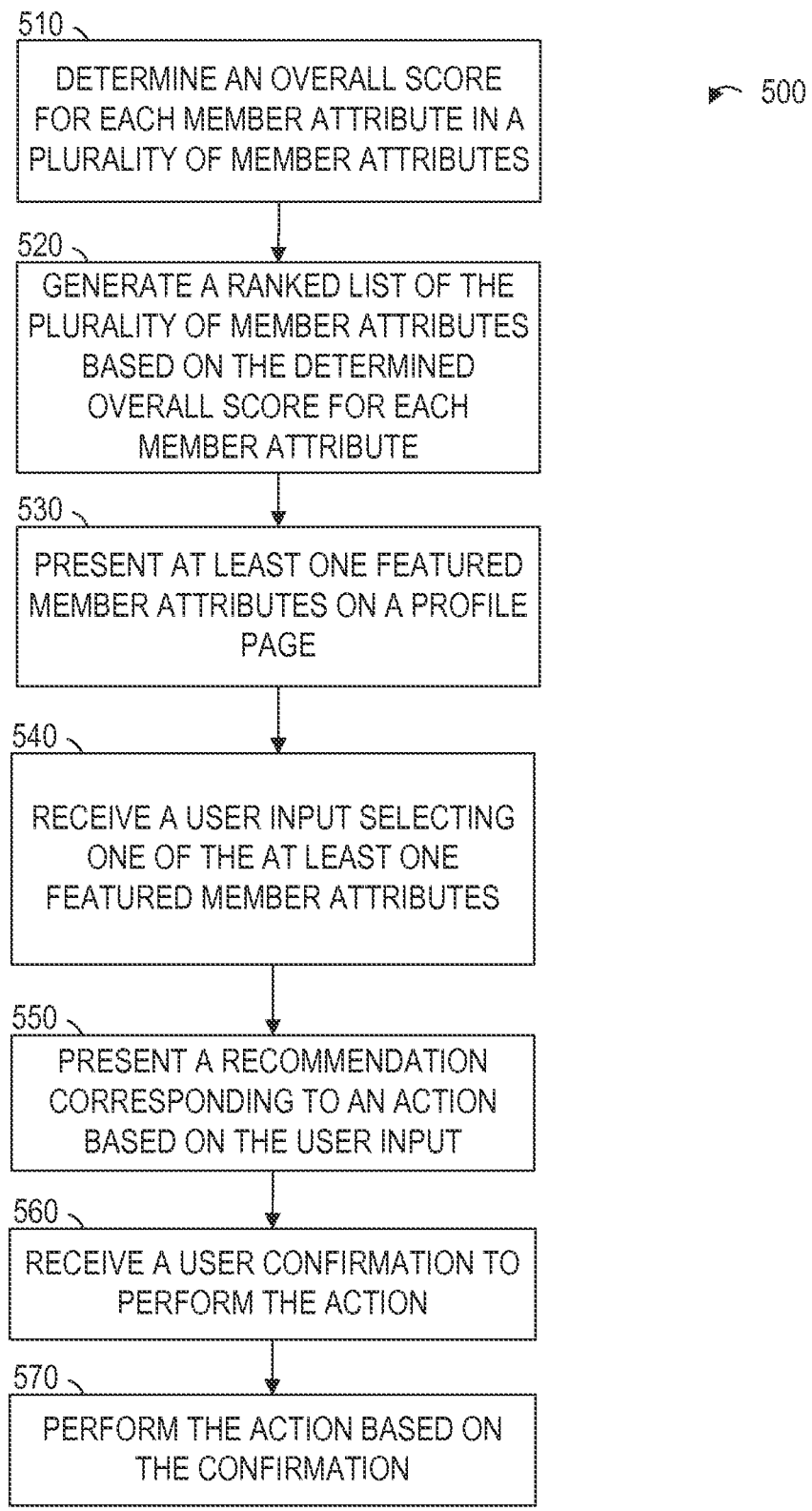
FIG. 5 is a flowchart illustrating a method of personalizing a member profile and performing an action based on interactions with a viewer, according to various embodiments.

FIG. 5 is a flowchart illustrating a method 500 for presenting a personalized member profile and performing an action based on interactions with a viewer, according to various embodiments. Operations in the method 500 may be performed by the network-based system 105, using modules described above with respect to FIGS. 2-4. As shown in FIG. 5, the method 500 includes operations 510, 520, 530, 540, 550, 560, and 570.

Figure 7:
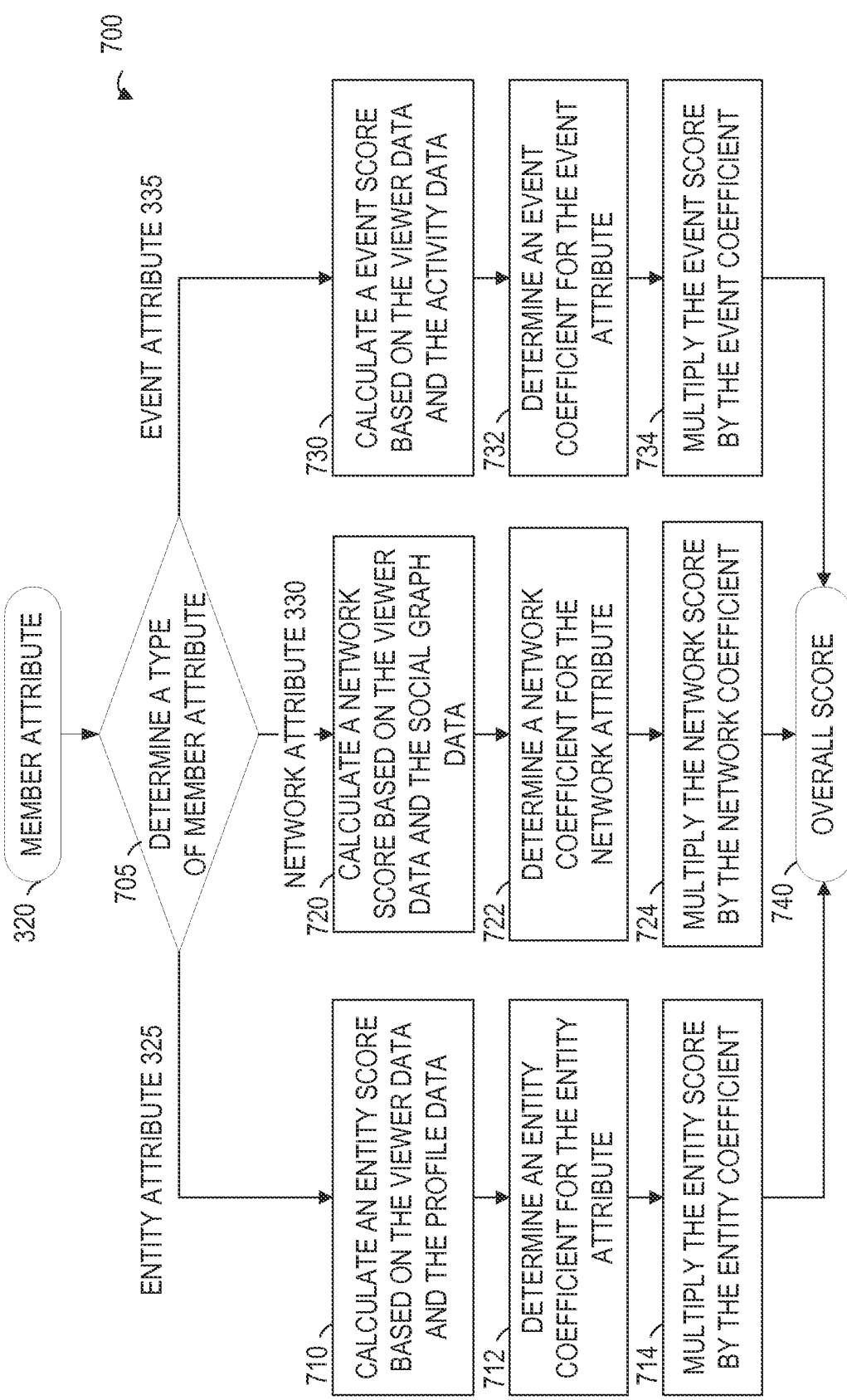
FIG. 7 is a flowchart illustrating a method of calculating an overall score of a member attribute to be utilized for personalizing a member profile, according to various embodiments.

At operation 510, the highlight module 204 can determine an overall score for each member attribute 320 in a plurality of member attributes 320. FIG. 7 describes techniques for calculating an overall score for each member attribute 320 to be used in an overall ranker 415.

At operation 520, the highlight module 204 can generate a ranked list of the plurality of member attributes 320 based on the determined overall score for each member attribute 320. For example, as described in FIG. 4, the highlight module 204 can generate an overall ranker 415. The overall ranker 415 can include a list of member attributes 320 and an overall score for each corresponding member attribute 320.

At operation 530, the profile page generation module 206 can present at least one featured member attribute 420 on a profile page. The featured member attribute 420 is a member attribute 320 with an overall score higher than overall scores associated with other member attributes 320. For example, the featured member attribute 420 can be the top member attribute 320 in the generated ranked list (e.g., overall ranker 415) of the plurality of member attributes 320.

At operation 540, the selection module 207 can receive a user input selecting one of the at least one featured member attributes 420. An example of a user input can include a viewer clicking the featured member attribute 420 (e.g., highlight).

At operation 550, the selection module 207 can present a recommendation corresponding to an action based on the user input. The recommendation can be determined in real-time using a processor in the social network system 210 or predetermined using the offline data processing module 220. Continuing with the example, in response to a user clicking on the highlight, the selection module 207 can present a graphical user interface (e.g., popup window) which includes a recommended action, such as a recommendation to message the member. In some instances, the recommendation corresponding to an action can be based on the determined overall score. In some instances, the recommendation corresponding to an action can be based on the sender score 217 or the receiver score 219. In some instances, the recommendation corresponding to an action can be based on the member data 218 of the sender or the member data 218 of the receiver.

As previously described, recommend actions can include sending an email to the receiver on behalf of the sender, requesting a connection in the social network system 210, messaging the receiver on behalf of the sender using a messaging application in the social network system 210, or request an introduction of the sender to a third member of the social network by the receiver.

At operation 560, the action module 208 can receive a user confirmation to perform the action. The user 132 can confirm to proceed with the recommendation with a confirmation. Continuing with the example, when receiving the recommendation, the user 132 can press a confirm button on the graphical user interface.

At operation 570, the action module 208 can perform the action based on the confirmation. Example actions include, but are not limited to, sending a connection request to the member, messaging the member through a messaging application in the social network system 210, or emailing the member.

Figure 6:
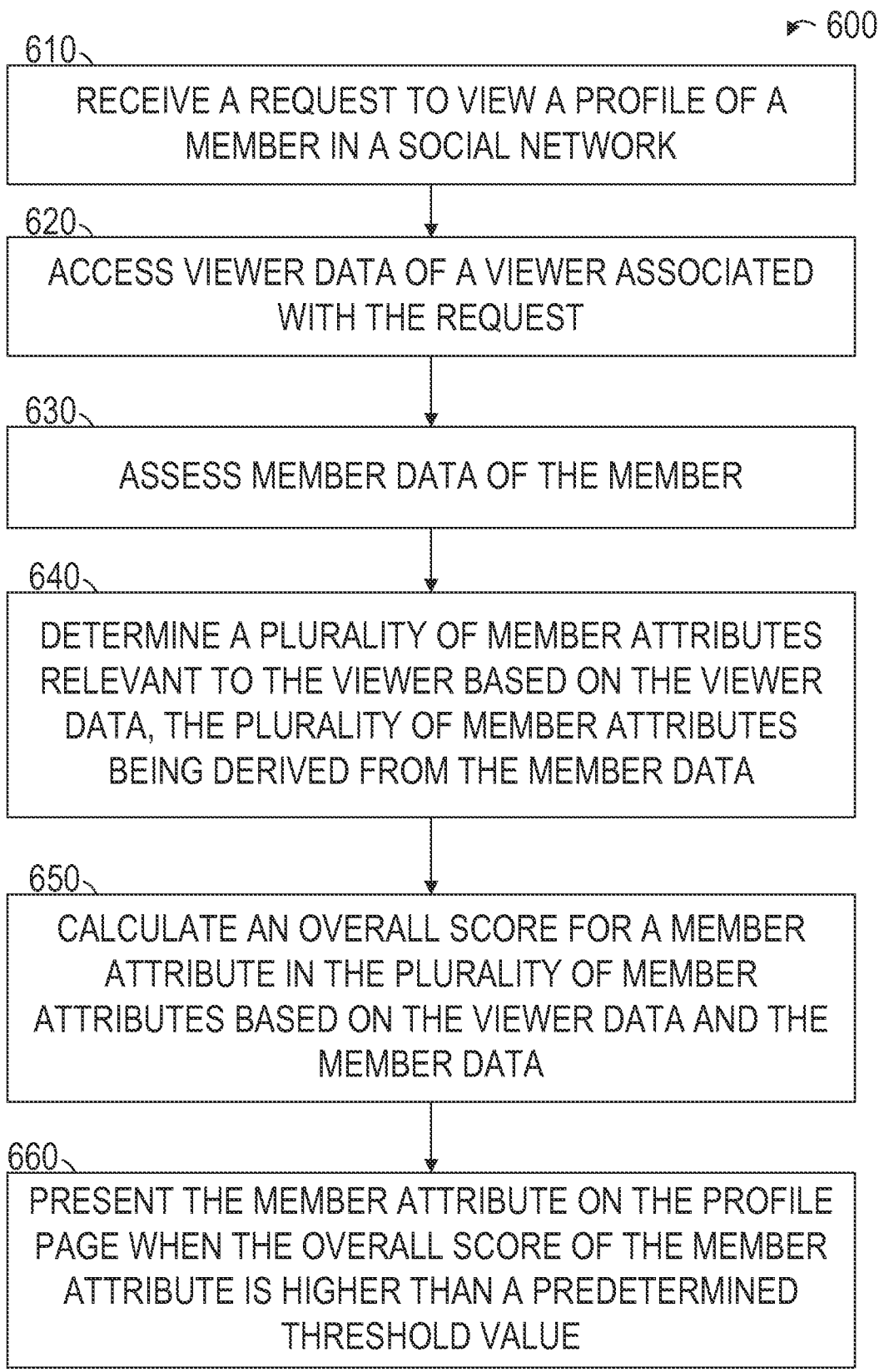
FIG. 6 is a flowchart illustrating a method of personalizing a member profile based on information accessed from a profile of a viewer, according to various embodiments.

FIG. 6 is a flowchart illustrating a method 600 for personalizing a member profile based on information accessed from a profile of a viewer, according to various embodiments. Operations in the method 600 may be performed by the network-based system 105, using modules described above with respect to FIGS. 2-4. As shown in FIG. 6, the method 600 includes operations 610, 620, 630, 640, 650, and 660.

At operation 610, the social network system 210 can receive a request to view a profile of a member in a social network. For example, user 132, using device 130, may want to view the profile page corresponding to a member of the social network system 210. In this example, user 132 is referred to as the viewer. The request can be transmitted from device 130 to the highlight module 204.

At operation 620, the social network system 210 can access viewer data of a viewer associated with the request. Continuing with the example, in response to receiving the request from operation 610, the highlight module 204 can access the viewer data of the viewer (e.g., user 132). The viewer data can include profile data 212, social graph data 214, and activity data 216 associated with the viewer.

At operation 630, the social network system 210 can access member data 218 of the member. Continuing with the example, in addition to accessing the viewer data, the highlight module 204 accesses member data 218 of the member associated with the profile page that the viewer has requested to view. As described in FIG. 2, the member data 218 includes profile data 212 of the member, social graph data 214 of the member, and activity data 216 of the member. In some instances, the profile data 212 is accessed by the entity module 305, the social graph data 214 is accessed by the network module 310, and the activity data 216 is accessed by the event module 315.

At operation 640, the social network system 210 can determine a plurality of member attributes 320 relevant to the viewer based on the viewer data. The plurality of member attributes 320 is derived from the member data 218. For example, the consolidation module 410 can generate the overall ranker 415 as described in FIG. 4. The overall ranker 415 can include a list of URLs associated with each member attribute 320 in the plurality of member attributes 320, and an overall score corresponding to each member attribute 320 in the plurality of member attributes 320. FIG. 7 describes techniques for generating the overall ranker 415.

In some instances, each member attribute 320 is associated with a unique URL. Additionally, the highlight module 204 can transmit the unique URL associated with the member attribute 320 to the device 130. Alternatively, the highlight module 204 can transmit the unique URL to the profile page generation module 206, and the profile page generation module 206 can use the unique URL to obtain the information to generate the highlight on the profile page.

At operation 650, the social network system 210 (e.g., profile page generation module 206) can calculate an overall score for a member attribute 320 in the plurality of member attributes 320 based on the viewer data and the member data 218. As previously mentioned, the overall ranker 415 includes an overall score for each member attribute 320 in the plurality of the member attributes 320. FIG. 7 describes techniques for calculating the overall score.

In some instances, the highlight module 204 can determine an overall score for each member attribute 320 in the plurality of member attributes 320. Additionally, the highlight module 204 can generate a ranked list (e.g., overall ranker 415) of the plurality of member attributes 320 based on the overall score for each member attribute 320 in the plurality of member attributes 320.

At operation 660, the social network system 210 can cause the presentation of the member attribute 320 on the profile page when the overall score is higher than a predetermined threshold value. A member attribute 320 having an overall score that is higher than the predetermined threshold value is an example of a featured member attribute 420, as described in FIG. 4. Continuing with the example, the profile page generation module 206 can use the overall ranker 415 to determine a featured member attribute 420. Then, the profile page generation module 206 can generate a personalized profile page of the member that is specific to the viewer by including the featured member attribute 420.

In some instances, the member attribute 320 is only presented on the profile page when at least a predetermined number of member attributes 320 are higher than the predetermined threshold value.

Additionally, the profile page generation module 206 can cause the presentation of at least one featured member attribute 420 on the profile page. The at least one featured member attribute 420 has an overall score that is higher than other overall scores associated with remaining member attributes 320 in the rank list (e.g., overall ranker 415). For example, the featured member attribute 420 can be the top predetermined number of (e.g., top three) member attribute 320 in the generated ranked list of the plurality of member attributes 320 (e.g., overall ranker 415).

FIG. 7 is a flowchart illustrating a method 700 for calculating an overall score of a member attribute 320 based on an entity score, a network score or an event score, according to various embodiments. Operations in the method 700 may be performed by the network-based system 105, using modules described above with respect to FIGS. 2-4. As shown in FIG. 7, the method 700 includes operations 705, 710, 712, 714, 720, 722, 724, 730, 732, 734, and 740.

At operation 705, the highlight module 204 can determine a type of a member attribute 320.

When the determined type of the member attribute 320 is an entity attribute 325, the entity module 305 can calculate an entity score based on the viewer data and the profile data 212 at operation 710. Then, at operation 712, the highlight module 204 (e.g., consolidation module 410) can determine an entity coefficient for the entity attribute 325. The entity coefficient can be based on past performance data associated with the entity attribute 325, such as the likelihood of the viewer clicking a highlight or requesting to perform a recommended action. Subsequently, at operation 714, highlight module 204 (e.g., consolidation module 410) can multiply the entity score by the entity coefficient to calculate the overall score, at operation 740, of the member attribute 320. As previously discussed, the consolidation module 410 can generate an overall ranker 415 that includes a list of the member attributes 320 and their corresponding overall scores.

For example, the entity attribute 325 includes information related to a common employer for the member and the viewer, a common educational institution for the member and the viewer, information related to a skill of the member, or other information derived from the profile data 212 of the member and the viewer data.

When the determined type of the member attribute 320 is a network attribute 330, the network module 310 can calculate a network score based on the viewer data and the social graph data 214 at operation 720. Then, at operation 722, the highlight module 204 can determine a network coefficient for the network attribute 330. The network coefficient can be based on past performance data associated with the network attribute 330, such as the likelihood of the viewer clicking a highlight or requesting to perform a recommended action. Subsequently, at operation 724, the highlight module 204 (e.g., consolidation module 410) can multiply the network score by the network coefficient to calculate, at operation 740, the overall score of the member attribute 320.

For example, the network attribute 330 includes information related to a job opening at an employer of the member, a connection of the member in the social network, or other information derived from the social graph data 214 of the member and the viewer data.

When the determined type of the member attribute 320 is an event attribute 335, the event module 315 can calculate an event score based on the viewer data and the activity data 216 at operation 730. Then, at operation 732, the highlight module 204 can determine an event coefficient for the event attribute 335. The event coefficient can be based on past performance data associated with the event attribute 335, such as the likelihood of the viewer clicking a highlight or requesting to perform a recommended action. Subsequently, at operation 734, the highlight module 204 (e.g., consolidation module 410) can multiply the event score by the event coefficient to calculate the overall score of the member attribute 320 at operation 740.

For example, the event attribute 335 includes information related to a content posting in the social network by the member, or other information derived from the activity data 216 of the member and the viewer data.

Figure 8:
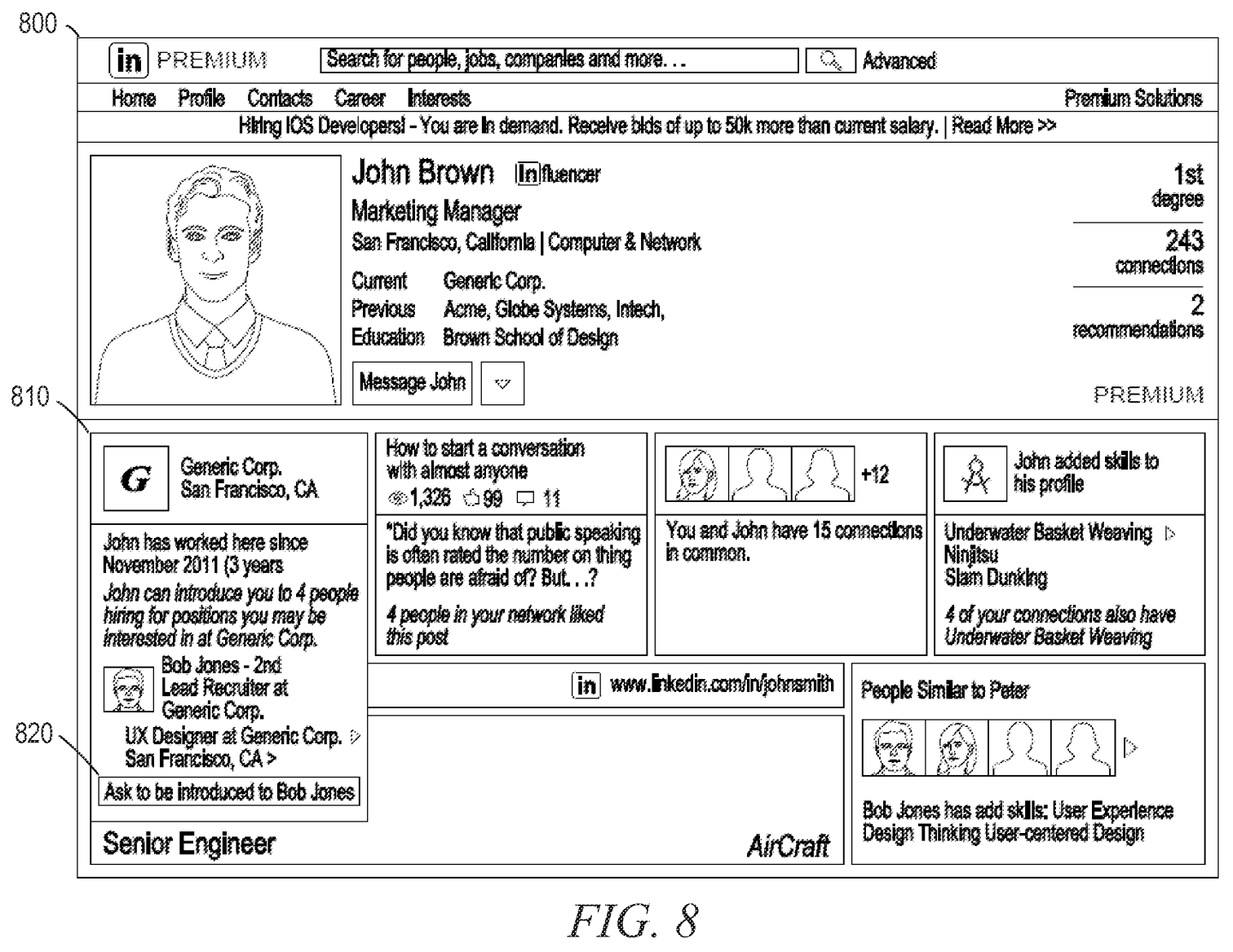

FIG. 8 is an example of a personalized member profile 800 of a member in a social network system 210, according to various embodiments. The personalized member profile 800 includes a highlight 810. The highlight 810 is an example of a featured member attribute 420. The highlight 810 is presented to a viewer based on information accessed from the profile data 212, social graph data 214, and activity data 216 of the viewer. In this example, the highlight 810 relates to information about the employer of the member. Additionally, the highlight 810 includes a recommendation 820 to ask the member to introduce the viewer to "4 people hiring for positions" that the viewer may be interested in. If the viewer confirms the recommendation 820 (e.g., asks for an introduction), then the action module 208 can ask the member to introduce the viewer to the member's network as recommended.

FIG. 9 is a flowchart illustrating a method 900 for classifying an interaction between a receiver and a sender, and updating the receiver and sender scores 219 & 217 based on the interaction, according to various embodiments. Operations in the method 900 may be performed by the network-based system 105, using modules described above with respect to FIGS. 2-4. As shown in FIG. 9, the method 900 includes operations 910, 920, 930, and 940.

At operation 910, a sender (e.g., viewer) can transmit a communication to the receiver (e.g., member owning the profile page). The communication can be based on a suggested action (e.g., featured member attribute 420) that the sender has clicked on. For example, once the sender clicks on the featured member attribute 420 on the profile page of the receiver, the profile page generation module 206 can present a suggested action. The sender can confirm the suggested action, which results in the social network system 210 transmitting a communication to the receiver. The communication can include, but is not limited to, a message, a connection request, or an email.

The message can include, but is not limited to, a general compliment, a message of being impressed, a message of being inspired, a recognition message, an appreciation message, a message of being grateful, an inquiry, a request for recommendation, a request for feedback, and a suggestion.

At operation 920, the social network system 210 can determine the receiver's response to the communication transmitted at operation 910. In some instances, the determination can be performed by the selection module 207 or the action module 208. The receiver can either respond to the communication, open the communication but not respond, flag the communication as inappropriate, or ignore the communication (e.g., not open the communication).

At operation 930, the social network system 210 can classify an interaction based on the receiver response determined at operation 920. FIG. 10 describes techniques for classifying the interaction. In some instances, the classification can be performed by the selection module 207 or the action module 208.

At operation 940, the social network system 210 can determine (e.g., update) a sender score 217 associated with the sender and a receiver score 219 associated with the receiver based on the classified interaction. In some instances, the determination can be performed by the selection module 207 or the action module 208. FIG. 11 describes techniques for updating the scores.

As previously described, the sender score 217 can be a score associated with a member transmitting a communication to a receiver. For example, the sender score 217 can: increase when the communication from the sender is classified as positive; decrease when the communication from the sender is classified as negative; or stay the same when the communication from the sender is classified as neutral. The receiver score 219 can be a score associated with the receiver's response to the transmitted communication. For example, the receiver score 219 can be updated based on the classification of the communication and whether the receiver responds to the communication.

FIG. 10 is a classification table 1000 illustrating the scoring system used at operation 930, according the various embodiments.

The classification table 1000 is used at operation 930 to classify the communication between the sender and the receiver, and to determine (e.g., update) the sender score of the sender (e.g., sender score 217) and the receiver (e.g., receiver score 219) based on the classification.

In some instances, the sender score 217 and the receiver score 219 of a member can have a default value. The default value can be predetermined, such as a value of 0. Additionally, based on the interactions as classified in FIG. 10, the sender score 217 and the receiver score 219 can be updated by incrementing the score or reducing the score.

According to some embodiments, the communication transmitted at operation 910 can be classified as a positive communication 1030, a neutral communication 1040, or a negative communication 1050. The classification can be determined by the selection module 207 or the action module 208 using machine learning techniques. The classification can also be determined based on historical data from interactions with previous communication.

Moreover, an interaction between the receiver and the sender can be determined in response to the transmission. For example, the sender may receive a response 1010 from the sender, or the sender may receive no response 1020 from the sender.

Subsequently, based on the classification of the communication and response, the interaction can be classified using the scoring table 1000. The classification table 1000 includes, but is not limited to, six different classifications, which include S1, S2, S3, S4, S5, and S6. Based on each classification, the sender score 217 and the receiver score 219 are updated.

For example, an S1 classification can improve (e.g., increment the score) both sender score 217 and the receiver score 219. An S2 classification can improve the sender score 217, and may not affect (e.g., score is unchanged) the receiver score 219. An S3 classification can improve both the sender 217 and receiver score 219, but the scores may not increase as much as the increase from the S1 classification. An S4 classification may not change the sender and the receiver score 219. An S5 and S6 scores may reduce the sender score 217. An S5 and S6 scores may not affect the receiver score 219.

FIG. 11 is a flowchart illustrating a method 1100 updating a sender score 217 and a receiver score 219 based on a classification of the interaction between the sender and the receiver, according to various embodiments.

At operation 1110, the social network system 210 receives a profile request to view a profile of a member in a social network. In some instances, the profile request can be received by user interface 202. Alternatively, the profile request can be received from a device 130 of first member of the social network system 210 using a network interface. The first member can be also referred to as a sender. The profile request can be of the profile of a second member. The second member can also be referred to as the receiver.

At operation 1120, the social network system 210 accesses a receiver score 219 from a first database 115 based on the received profile request. In some instances, the accessing can be performed by the highlight module 204. In some instances, the first database 115 includes member data 218. The receiver score 219 can be associated with the receiver. For example, the receiver score 219 can be based on a likelihood of a response 1010 by the receiver.

In some instances, the social network system 210 can also access a sender score 217 associated with the sender. In some instances, the accessing can be performed by the highlight module 204. As previously mentioned, the sender score 217 can be stored in a second database 115 or the first database 115. The sender is the member in the social network system 210 that requests to view the profile page of the receiver at operation 1110.

At operation 1130, the social network system 210 determines a suggested action to present on the profile page based on the sender score 217 and the receiver score 219. In some instances, the suggested action can be solely based on the receiver score 219 or the sender score 217. In some instances, the determination can be performed by the selection module 207 or the action module 208. Example of suggested actions can include sending a messaging using a messaging application of the social network system 210, an email to the receiver on behalf of the sender, a connection request to the receiver, an introduction request to another member of the social network system 210 that has a first-degree connection to the receiver, and so on.

As previously described in FIG. 6, the highlight module 204 and the profile page generation module 206 can include a featured member attribute 420 when presenting the profile page of the receiver on the sender device 130 (e.g., mobile device) of the sender. The featured member attribute 420 can also be associated with a suggested action.

For example, the featured member attribute 420 can highlight that the receiver has a first-degree connection with an employee at Company A. In this example, in addition to presenting the featured member attribute 420 on the profile page of the receiver, a suggested action, such as a request for an introduction, can also be presented on the profile page of the receiver. If the sender confirms the request for the introduction, the social network system 210 can message the receiver on behalf of the sender to introduce the sender to the employee. Alternatively, the social network system 210 can email the receiver on behalf of the sender.

In addition to the techniques described in FIG. 6, the sender score 217 and the receiver score 219 can be used determine the featured member attribute 420 to present on the profile page. Furthermore, when the sender score 217 is below a threshold, the highlight module 204 may assume that the sender is a spammer and remove the suggested action functionality from the user interface of the sender. Alternatively, when the receiver is an influencer (e.g., a member having a number of followers that is above a threshold) at the social network system 210, then the highlight module 204 may limit the type of communication allowed with the influencer.

At operation 1140, the social network system 210 can receive a sender confirmation to perform the suggested action. In some instances, the selection module 207 can receive the sender confirmation. The sender confirmation can be similar to the user confirmation received at operation 560 of FIG. 5.

At operation 1150, the social network system 210 can transmit a communication associated with the suggested action to the receiver. In some instances, the action module 208 can transmit the communication. The transmitted communication can be similar to the action performed at operation 570 of FIG. 5. The communication includes a positive communication 1030, a neutral communication 1040, or a negative communication 1050, as illustrated in FIG. 10.

The communication can include an email, a message via the social network system 210, a connection request, a general compliment, a communication suggesting that the sender is impressed, a communication suggesting that the sender is inspired, a communication recognizing the receiver for a well done job, a communication relating to aesthetic appreciation (e.g., beautiful background) of the profile page, a communication suggesting that the sender is grateful, a communication suggesting that the sender is curious, a general request (e.g., recommendation 820, feedback, introduction), a general suggestion, and so on.

In some instances, the suggested action is to send a message on behalf of the sender to the receiver, wherein the message is sent using a messaging application in the social network.

In some instances, the suggested action is to send an email from the sender to the receiver.

In some instances, the suggested action is to send a connection request from the sender to the receiver.

In some instances, the suggested action is to send a request to introduce the sender to a member that is connected to the receiver.

At operation 1160, the social network system 210 can classify an interaction between the sender and the receiver based on a receiver response 1010 to the transmitted communication. In some instances, the action module 208 can classify the interaction. For example, when the communication is a message sent using the messaging application of the social network system 210, the social network system 210 can determine if the message has been opened, has not been opened, or has been replied to. Based on the action of the receiver in response to receiving the message, the social network system 210 can classify the interaction. In some instances, the social network system 210 can access (e.g., using a network interface) the messaging application of the social network system 210 stored on the device 150 of the receiver to determine if the message has been opened or replied to.

According to some embodiments, a receiver response includes a response 1010 from the receiver, or no response 1020 from the receiver, as illustrated in FIG. 10. Additionally, the receiver response can include viewing the communication but not responding to the sender, flagging the communication as inappropriate, and not opening the communication. FIG. 10 illustrates the classification table 1000 used to classify the interaction at operation 1160, according to some embodiments.

At operation 1170, the social network system 210 can update the receiver score 219 and the sender score 217 based on the classification. In some instances, only the receiver score 219 or the sender score 217 may be updated based on the classification. In some instances, the action module 208 can update the receiver score 219 and the sender score 217. FIG. 10 illustrates the classification table 1000 used to update the sender score 217 and the receiver score 219, according to some embodiments. The social network system 210 can access the first database 115 or the second database 115 to update the sender score 217 or the receiver score 219.

In some instances, the receiver score 219 and sender score 217 is increased when determined that the receiver has responded to the communication.

In some instances, the transmitted communication is classified as a positive communication 1030, a neutral communication 1040, or a negative communication 1050. For example, the sender score 217 is increased when the transmitted communication is a positive communication 1030, and the sender score 217 is decreased when the transmitted communication is a negative communication 1050.

In some instances, the social network system 210 can determine whether the receiver is active based on a receiver activity associated with the receiver over a predetermined amount of time, the receiver activity including a past response by the receiver based on a past transmitted communication. For example, the receiver score 219 is increased based on the determination that the receiver is active.

In some instances, the social network system 210 can access member data 218 of the receiver based on the received profile request. The member data 218 having a plurality of member attributes 320 associated with the receiver. Additionally, an overall score can be calculated for each member attribute 320 in the plurality of member attributes 320. Then a featured member attribute 420 can be determined from the plurality of member attributes 320 based on the overall score being higher than a threshold, similar to method 600 in FIG. 6. Additionally, the suggested action can be further based on the featured member attribute 420. For example, the featured member attribute 420 can highlight that the receiver has a first-degree connection with an employee at Company A. In this example, in addition to presenting the featured member attribute 420 on the profile page of the receiver, a suggested action, such as a request for an introduction, can also be presented on the profile page of the receiver. If the sender confirms the request for the introduction, the social network system 210 can message the receiver on behalf of the sender to introduce the sender to the employee. Alternatively, the social network system 210 can email the receiver on behalf of the sender.

Figure 12:
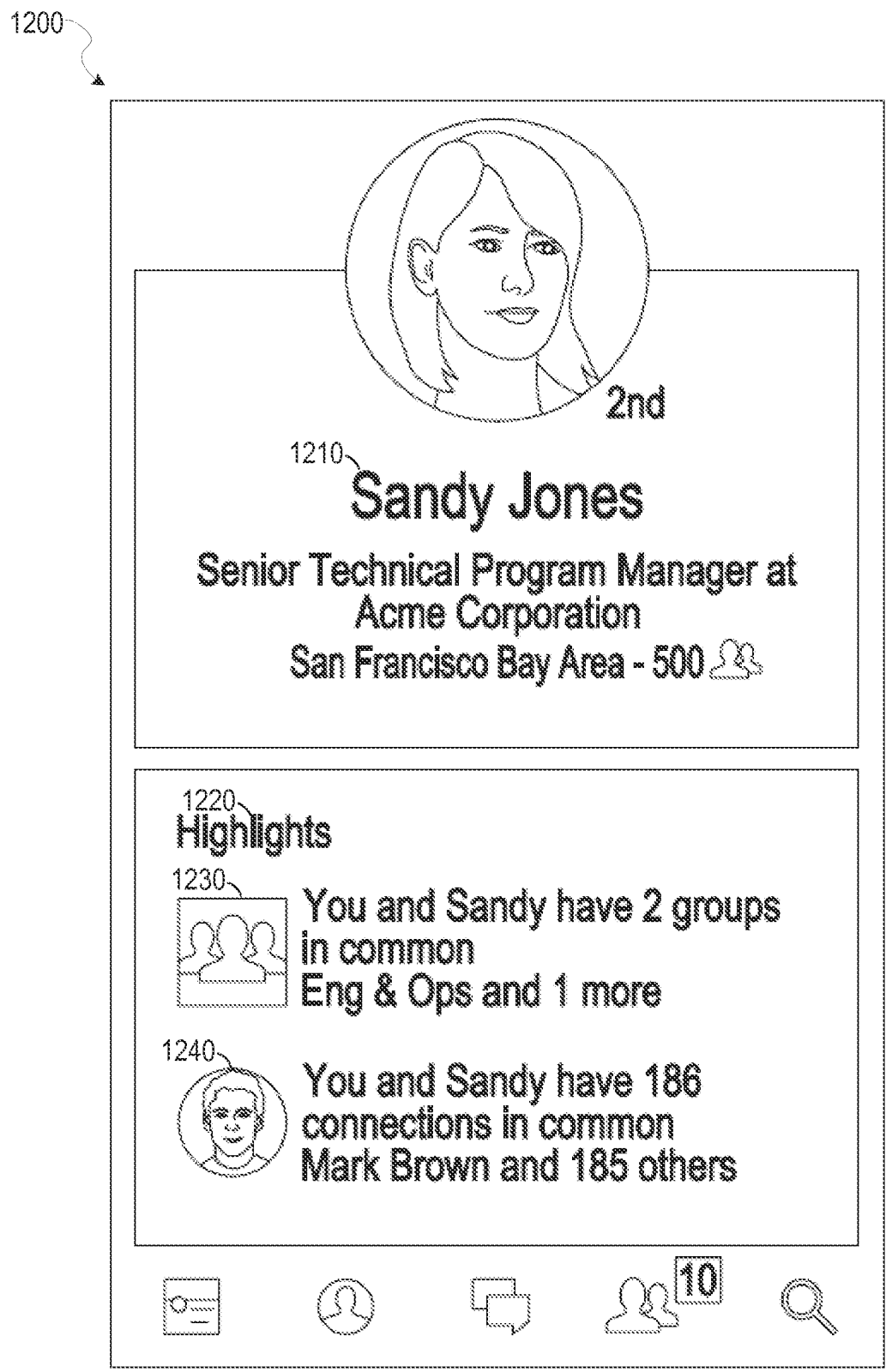
FIG. 12 is a user interface on a mobile device with a personalized profile page with two featured member attributes of a member of the social network, according to various embodiments.

FIG. 12 is a user interface 1200 on a mobile device with a personalized profile page with featured member attributes 420 of a member of the social network, according to various embodiments. The user interface 1200 can include a personalized profile page 1210 of a member of the social network system 210. Additionally, the personalized profile page 1210 can include featured member attributes 420, which can also be referred to as highlights 1220. The highlights 1220 can include a first featured member attribute 1230 and a second featured member attribute 1240. In some instances, a suggested action as described in method 1100 can be presented alongside the first featured member attribute 1230 or the second featured member attribute 1240. Alternatively, the suggested action can be presented on the user interface 1200 when the sender selects one of the featured member attributes 420 or highlights 1220.

According to various example embodiments, one or more of the methodologies described herein may facilitate automatic generation of communication (e.g., message, email) based on calculated score from the sender and receiver of the communication. Additionally, specialized databases 115 may be store the metadata in order to calculate the sender score 217 and receiver score 219, as illustrated in FIG. 2. For example, the calculation may be data-intensive, and in order to present a featured member attribute 420 or a suggested action in real-time to a sender, some of the processing of the data may be performed using the offline data processor module 220. Furthermore, the social network system 210 stores and indexes the member data 218, especially the profile data 212, in such a way as to allow an efficient retrieval and processing of the information in order to present the recommendations 820 and alerts in real-time.

When these effects are considered in aggregate, one or more of the methodologies described herein may obviate a need for certain human efforts or resources that otherwise would be involved in generating the featured member attributes 420 and suggested action. Additionally, the methodologies described herein facilitate efficient marketing, which can increase revenues and sales. Furthermore, computing resources used by one or more machines, databases 115, or devices 130, 150 (e.g., within the network environment 100) may similarly be reduced (e.g., by pre-determining sites to ingest company information and member information, by automatically triggering the alerts and recommendation 820). Examples of such computing resources include processor cycles, network traffic, memory usage, data storage capacity, power consumption, and cooling capacity.

Example Machine Architecture and Machine-Readable Medium

Figure 13:
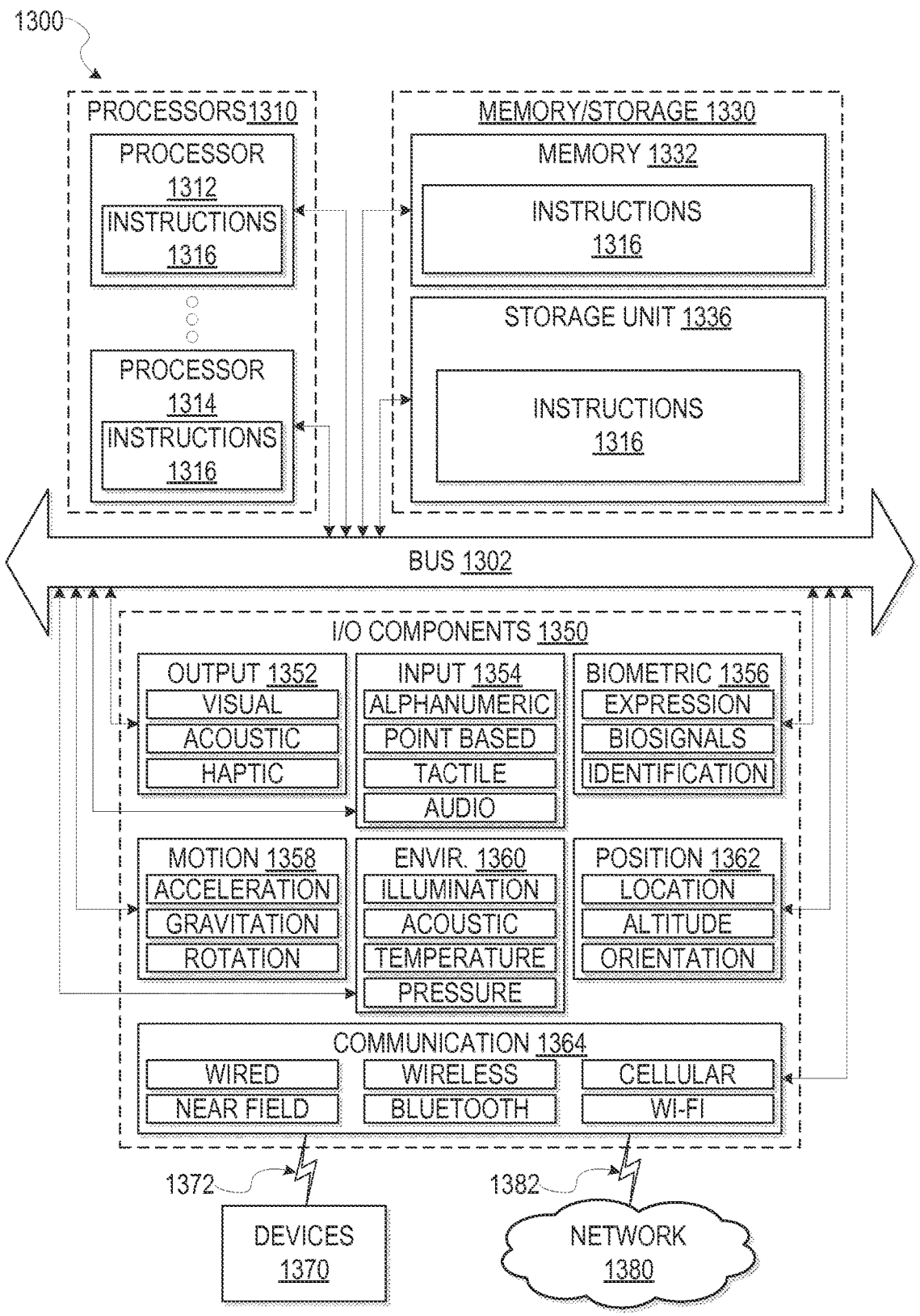
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions 1316 may cause the machine 1300 to execute the flow diagrams of FIGS. 5, 6, 7, and 11. Additionally, or alternatively, the instructions 1316 may implement the highlight module 204, profile page generation module 206, selection module 207, or action module 208 of FIG. 2, and so forth. The instructions 1316 transform the general, non-programmed machine 1300 into a particular machine programmed to carry out the described and illustrated functions in the manner described. In alternative embodiments, the machine 1300 operates as a stand-alone device or may be coupled (e.g., networked) to other machines. In a networked deployment, the machine 1300 may operate in the capacity of a server machine 110 or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1312 and processor 1314 that may execute instructions 1316. The term "processor" is intended to include a multi-core processor that may comprise two or more independent processors 1310 (sometimes referred to as "cores") that may execute instructions 1316 contemporaneously. Although FIG. 13 shows multiple processors 1310, the machine 1300 may include a single processor 1312 with a single core, a single processor 1312 with multiple cores (e.g., a multi-core processor), multiple processors 1310 with a single core, multiple processors 1310 with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor 1310's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device 130 able to store instructions 1316 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine 1300 will depend on the type of machine 1300. For example, portable machines such as mobile phones will likely include a touch input device or other such input mechanisms, while a headless server machine 110 will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi®) network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 1310) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1312 or other programmable processor 1312. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible company, and such a tangible company may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1312 configured by software to become a special-purpose processor, the general-purpose processor 1312 may be configured as respectively different special-purpose processors (e.g., comprising different hardware modules) at different times. Software (e.g., a software module) may accordingly configure one or more processors 1310, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented modules that operate to perform one or more operations or functions described herein. As used herein, "processor-implemented module" refers to a hardware module implemented using one or more processors 1310.

Similarly, the methods described herein may be at least partially processor-implemented, a processor 1312 being an example of hardware. For example, at least some of the operations of a method may be performed by one or more processors 1310 or processor-implemented modules. As used herein, "processor-implemented module" refers to a hardware module in which the hardware includes one or more processors 1310. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an application programming interface (API)).

The performance of certain operations may be distributed among the one or more processors 1310, not only residing within a single machine 1300, but deployed across a number of machines. In some example embodiments, the one or more processors 1310 or processor-implemented modules may be located in a single geographic location (e.g., within a home environment, an office environment, or a server farm). In other example embodiments, the one or more processors 1310 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 1300. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 1300 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving a profile request, from a sender device of a sender, to view a profile page of a receiver, the sender and receiver being members of an online social network service;
   accessing, from a database in the online social network service, a receiver score associated with the receiver and a sender score associated with the sender, the receiver score representing an aggregation of classifications of past interactions of the receiver with previous senders, the sender score representing an aggregation of classifications of past interactions of the sender with previous receivers, the classifications of the past interactions of the receiver and the classifications of the past interactions of the sender kept in a scoring table having columns pertaining to responsiveness of past receivers and rows pertaining to whether communications with past senders were positive, neutral, or negative communications;
   determining, using a processor, a suggested action based on the receiver score;
   presenting, on a display of the sender device, the profile page of the receiver and the suggested action;
   receiving a confirmation, from the sender device, to perform the suggested action;
   transmitting, to a receiver device associated with the receiver, a communication associated with the suggested action in response to the received confirmation;
   classifying an interaction between the sender and the receiver based on a response, from the receiver device, to the transmitted communication, the classifying based on the scoring table; and
   updating the receiver score and the sender score based on the classified interaction, the updating including decreasing the receiver score or the sender score based on a negative classification or increasing the receiver score or the sender score based on a positive classification; and
   storing the updated receiver score and updated sender score in the database and making the updated receiver score and the updated sender score accessible for determining and presenting additional suggested actions on the display of the sender device or displays of other sender devices.

2. The method of claim 1, wherein the receiver score is generated based on a likelihood of a response, by the receiver, to the communication.

3. The method of claim 1, further comprising:
accessing a sender score associated with the sender; and wherein the suggested action is further determined based on the sender score.

4. The method of claim 3, wherein the sender score is stored in a second database in the online social network service.

5. The method of claim 3, further comprising:
updating the sender score based on the classified interaction.

6. The method of claim 5, wherein the receiver score and the sender score are increased when the classified interaction is characterized by the receiver responding to the communication.

7. The method of claim 5, wherein the transmitted communication is classified as a positive communication, a neutral communication, or a negative communication.

8. The method of claim 7, wherein the sender score is increased when the transmitted communication is a positive communication.

9. The method of claim 7, wherein the sender score is decreased when the transmitted communication is a negative communication.

10. The method of claim 1, wherein the suggested action is to send a message on behalf of the sender to the receiver, wherein the message is sent using a messaging application in the online social network service.

11. The method of claim 1, wherein the suggested action is to send an email from the sender to the receiver.

12. The method of claim 1, wherein the suggested action is to send a connection request in the online social network service from the sender to the receiver.

13. The method of claim 1, wherein the suggested action is to send an introduction request to introduce the sender to another member in the online social network service that is connected to the receiver.

14. The method of claim 1, further comprising:
determining that the receiver is active based on a receiver activity associated with the receiver over a predetermined amount of time, the receiver activity including a past response by the receiver based on a past transmitted communication.

15. The method of claim 14, wherein the receiver score is increased based on the determination that the receiver is active.

16. The method of claim 1, further comprising:
accessing member data of the receiver based on the received profile request, the member data having a plurality of member attributes associated with the receiver;
determining a featured member attribute from the plurality of member attributes based on an overall score; and
wherein the suggested action is further based on the determined featured member attribute.

17. A non-transitory machine-readable storage medium comprising instructions that, when executed by one or more processors of a machine, cause the machine to perform operations comprising:
receiving a profile request, from a sender device of a sender, to view a profile page of a receiver, the sender and receiver being members of an online social network service;
accessing, from a first database in the online social network service, a receiver score associated with the receiver based on the received profile request, the receiver score representing an aggregation of classifications of past interactions of the receiver with previous senders, the sender score representing an aggregation of classifications of past interactions of the sender with previous receivers, the classifications of the past interactions of the receiver and the classifications of the past interactions of the sender kept in a scoring table having columns pertaining to responsiveness of past receivers and rows pertaining to whether communications with past senders were positive, neutral, or negative communications;
accessing, from a second database in the online social network service, a sender score associated with the sender, the sender score representing classifications of past interactions of the sender;
determining a suggested action based on the receiver score and the sender score;
causing presentation, on a display of the sender device, of the profile page of the receiver and the suggested action;
receiving a confirmation, from the sender device, to perform the suggested action;
transmitting, to a receiver device associated with the receiver, a communication associated with the suggested action in response to the received confirmation;
classifying an interaction between the sender and the receiver based on a response, from the receiver device, to the transmitted communication, the classifying based on the scoring table; and
updating the receiver score and the sender score based on the classified interaction, the updating including decreasing the receiver score or the sender score based on a negative classification or increasing the receiver score or the sender score based on a positive classification; and
storing the updated receiver score and updated sender score in the database and making the updated receiver score and the updated sender score accessible for determining and presenting additional suggested actions on the display of the sender device or displays of other sender devices.

18. The storage medium of claim 17, wherein the receiver score and the sender score are increased when the classified interaction is based on the receiver responding to the communication.

19. The storage medium of claim 17, further comprising instructions that cause the machine to perform in operations comprising:
accessing member data of the receiver based on the received profile request, the member data having a plurality of member attributes associated with the receiver;
determining a featured member attribute from the plurality of member attributes based on an overall score; and
wherein the suggested action is further based on the determined featured member attribute.

20. An online social network service system comprising:
a first database having a sender score for a sender in the online social network service system, the sender score representing classifications of past interactions of the sender;
a second database having a receiver score for a receiver in the online social network service system, the receiver score representing an aggregation of classifications of past interactions of the receiver with previous senders, the sender score representing an aggregation of classifications of past interactions of the sender with previous receivers, the classifications of the past interactions of the receiver and the classifications of the past interactions of the sender kept in a scoring table having columns pertaining to responsiveness of past receivers and rows pertaining to whether communications with past senders were positive, neutral, or negative communications;

a user interface to receive a profile request to view a profile page of the receiver; and one or more processors to:

determine a suggested action based on the receiver score and the sender score;

cause a presentation of the profile page of the receiver and the suggested action;

receive, from a sender device of the sender, a confirmation to perform the suggested action;

transmit, to a receiver device of the receiver, a communication associated with the suggested action in response to the received confirmation;

classifying an interaction between the sender and the receiver based on a response, from the receiver device, to the transmitted communication, the classifying based on the scoring table; and updating the receiver score and the sender score based on the classified interaction, the updating including decreasing the receiver score or the sender score based on a negative classification or increasing the receiver score or the sender score based on a positive classification; and storing the updated receiver score and updated sender score in the database and making the updated receiver score and the updated sender score accessible for determining and presenting additional suggested actions on the display of the sender device or displaying of other sender devices.

* * * * *

UNITED STATES PATENT AND TRADEMARK OFFICE
CERTIFICATE OF CORRECTION

PATENT NO. : 10,380,205 B2  
APPLICATION NO. : 14/843731  
DATED : August 13, 2019  
INVENTOR(S) : Moxon et al.

Page 1 of 1

It is certified that error appears in the above-identified patent and that said Letters Patent is hereby corrected as shown below:

On the Title Page

On page 2, in Column 2, item (56) under "Other Publications", Line 5, delete "Respons" and insert --Response-- therefor In the Claims In Column 28, Line 45, in Claim 19, after "perform", delete "in"

In Column 30, Lines 15-16, in Claim 20, delete "displaying" and insert --displays-- therefor Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*